United States Patent
Chen et al.

(10) Patent No.: US 9,560,867 B2
(45) Date of Patent: Feb. 7, 2017

(54) METHOD FOR REMOVAL OF METAL IONS FROM RICE HULL

(71) Applicant: Sunshine Kaidi New Energy Group Co., Ltd., Wuhan (CN)

(72) Inventors: Yilong Chen, Wuhan (CN); Yanfeng Zhang, Wuhan (CN); Leiming Tao, Wuhan (CN); Wenxue Luo, Wuhan (CN); Zhilong Wang, Wuhan (CN); Zhixiang Luo, Wuhan (CN); Yongjie Xue, Wuhan (CN)

(*) Notice: Subject to any disclaimer, the term of this patent is extended or adjusted under 35 U.S.C. 154(b) by 106 days.

(21) Appl. No.: 14/477,833

(22) Filed: Sep. 4, 2014

(65) Prior Publication Data

US 2014/0377422 A1 Dec. 25, 2014

Related U.S. Application Data

(63) Continuation-in-part of application No. PCT/CN2013/072165, filed on Mar. 5, 2013.

(30) Foreign Application Priority Data

Mar. 26, 2012 (CN) .......................... 2012 1 0082138

(51) Int. Cl.
| | | |
|---|---|---|
| *A23L 1/00* | (2006.01) | |
| *A23L 1/10* | (2006.01) | |
| *C01G 49/00* | (2006.01) | |
| *B09B 3/00* | (2006.01) | |
| *B09B 5/00* | (2006.01) | |

(52) U.S. Cl.
CPC ................. *A23L 1/1016* (2013.01); *A23L 5/23* (2016.08); *A23L 5/276* (2016.08); *A23L 7/115* (2016.08); *B09B 3/00* (2013.01); *B09B 5/00* (2013.01); *C01G 49/00* (2013.01); *A23V 2002/00* (2013.01)

(58) Field of Classification Search
CPC .... A23L 1/1016; A23L 1/0157; A23L 1/0152; B09B 5/00; B09B 3/00
See application file for complete search history.

(56) References Cited

FOREIGN PATENT DOCUMENTS

WO    2013/143377    * 10/2013

OTHER PUBLICATIONS

Translation of WO2013/143377, Oct. 2013.*

* cited by examiner

*Primary Examiner* — Steven Bos
(74) *Attorney, Agent, or Firm* — Matthias Scholl, PC; Matthias Scholl

(57) ABSTRACT

A method for removal of metal ions from rice hulls. The method includes: 1) providing a water storage reactor, and disposing a gas dispersion device at the bottom of the water storage reactor; 2) bagging rice hulls, placing it in the water storage reactor, and pressing down on the bagged rice hulls to be lower than a water surface in the water storage reactor; 3) spraying industrial flue gas into the water storage reactor; controlling the amount of the industrial flue gas such that about 1 g of carbon dioxide is dissolved per 100 g of water, thus generating a carbonic acid solution; 4) allowing the carbonic acid solution to react with metal ions in the rice hulls to yield a precipitate; and 5) washing the rice hulls collected in step 4), washing again with desalinated water, and then squeezing the rice hulls.

8 Claims, 3 Drawing Sheets

US 9,560,867 B2

METHOD FOR REMOVAL OF METAL IONS FROM RICE HULL

CROSS-REFERENCE TO RELATED APPLICATIONS

This application is a continuation-in-part of International Patent Application No. PCT/CN2013/072165 with an international filing date of Mar. 5, 2013, designating the United States, now pending, and further claims priority benefits to Chinese Patent Application No. 201210082138.1 filed Mar. 26, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18$^{th}$ Floor, Cambridge, Mass. 02142.

BACKGROUND OF THE INVENTION

Field of the Invention

The invention relates to the recycling of rice hulls, and more particularly to a method for removal of metal ions from rice hulls by utilizing industrial flue gas.

Description of the Related Art

Conventional methods for removing metal ions from rice hulls involve strong acids. Strong acids are harmful to human body and are environmental pollutants. In addition, the waste water resulting from the acid treatment cannot be drained off directly, thereby increasing the disposal cost.

SUMMARY OF THE INVENTION

In view of the above-described problems, it is one objective of the invention to a method for removal of metal ions from rice hulls by utilizing industrial flue gas that features high efficiency and environmental friendliness.

To achieve the above objective, in accordance with one embodiment of the invention, there is provided a method for removal of metal ions from rice hulls by utilizing industrial flue gas. The method comprises the following steps:

1) providing a water storage reactor, disposing a gas dispersion device at a bottom of the water storage reactor, and filling the water storage reactor with water;
2) bagging rice hulls and placing it in the water storage reactor, and submerging it in the water;
3) allowing industrial flue gas to be bubbled into the water via the gas dispersion device; controlling the amount of the industrial flue gas to correspond to 1 g of carbon dioxide per 100 g of water, whereby generating a carbonic acid solution;
4) allowing the carbonic acid solution to react with metal ions in the rice hulls to yield a precipitate; and
5) washing the rice hulls collected in step 4) to remove the precipitate, and squeezing the rice hulls, whereby removing the metal ion from the rice hulls.

In a class of this embodiment, the water storage reactor has a depth of between 6 and 10 m. Appropriate depth of the water storage reactor can ensure the carbon dioxide in the industrial flue gas is sufficiently dissolved in the water to yield a carbonic acid solution with a certain concentration.

In a class of this embodiment, the gas dispersion device comprises a gas orifice configured to horizontally or vertically agitate water to form vortexes, and the industrial flue gas is sprayed from the gas orifice. The vortexes of the water can improve the degree of dispersion of carbon dioxide in the water thereby facilitating the formation of carbonic acid. The gas orifice can be multiple in annular distribution, and sprays gas outward along a tangential direction.

In a class of this embodiment, the gas orifice is at least 1.5 m higher than the bottom of the water storage reactor. The carbonic acid reacts with the rice hulls to yield the precipitate. To prevent the precipitate from blocking the gas orifice, the gas orifice is at least 1.5 m higher than the bottom of the water storage reactor.

In a class of this embodiment, the gas orifice has a pore size of between 0.005 and 0.012 mm. The spray of the gas from the gas orifice satisfies the Laplace's equation, that is to say, additional pressure on the spherical surface is proportional to the surface tension coefficient and is inversely proportional to the radius of the spherical radius. When the surface tension coefficient is constant, the smaller the radius, the greater the additional pressure. The smaller the gas orifice, the smaller the sprayed bubbles. When small bubbles of carbon dioxide are sprayed from the gas orifice, the bubbles expand, and the surface tension decreases rapidly, the bubbles burst, thus increasing the contact area of the carbon dioxide with the water, and accelerating the formation of carbonic acid.

In a class of this embodiment, the gas dispersion device further comprises a plurality of microporous aerators, and the industrial flue gas is sprayed from the microporous aerators. The microporous aerators are configured to improve the dissolution of carbon dioxide in the water.

The present disclosure also provides another method for removal of metal ions from rice hulls by utilizing industrial flue gas. The method comprises the following steps:

1) providing a reaction tank, the reaction tank comprising a gas distributor disposed at a lower part thereof and a liquid distributor disposed at an upper part thereof, wherein, the gas distributor comprises microporous aerators, a recycle liquid outlet is disposed on a wall of the reaction tank below the gas distributor, a gas outlet is disposed at a top of the reaction tank, and a precipitate outlet is disposed at a bottom of the reaction tank;
2) filling the reaction tank with rice hulls and water, closing the gas outlet, and allowing the industrial flue gas to be sprayed from the microporous aerators of the gas distributor;
3) allowing carbon dioxide in the industrial flue gas to be dissolved in the water, 4 g of carbon dioxide per 100 g of water, to yield a carbonic acid solution;
4) allowing the carbon acid solution to react with a metal ion of the rice hulls to yield a precipitate; and
5) washing the rice hulls collected in step 4), washing again with desalinated water, and squeezing the rice hulls, whereby removing the metal ion from the rice hulls.

The principle of the method for removal of metal ions from rice hulls by utilizing industrial flue gas is summarized as follows. Carbon dioxide in the industrial flue gas is dissolved in water to yield carbonic acid which is used to acidify rice hulls where carbonic acid reacts with metal ions such as aluminum, calcium, magnesium, iron, manganese to yield corresponding insoluble salts. The precipitates are a carbonate or an oxide of the metal. Thus, the metal ions of the rice hulls can be efficiently removed. Carbon dioxide is a nonpolar molecule, but it is soluble in a strong polar solvent, and the dissolution thereof is related to the temperature, the pressure, and the properties of the solvent. With the increase of temperature, the dissolution of carbon dioxide decreases. At normal temperature and pressure, the carbon dioxide volume and the water volume in a saturated aqueous solution is almost 1:1. Most of the carbon dioxide is weakly bound to water molecule to form a hydrate molecule, and only a small part of the carbon dioxide participates in the formation of carbonic acid. Low concentration of carbonic acid cannot treat a large amount of rice hulls. When the pressure of carbon dioxide is less than 0.5 MPa, the dissolution is proportional to the pressure; when the pressure exceeds 0.5 MPa, due to the formation of carbonic acid, with the increase of the pressure, the dissolution of carbon dioxide increases rapidly. Thus, to improve the concentration of carbonic acid in water so as to remove the metal ions in the rice hulls, it is a key element to increase the carbon dioxide pressure.

There are three ways to improve the pressure balance of carbon dioxide on the liquid surface. The first is to make use of water pressure, the second is to dispose a gas dispersion device, and the third is to increase the gas pressure on the liquid surface in an enclosed tank. One method of the present disclosure is to dispose a water storage reactor which makes use of the water pressure and the gas dispersion device to improve the dissolution of carbon dioxide in water. Another method of the present disclosure is to dispose a reaction tank which makes use of an enclosed space to improve the carbon dioxide pressure on the liquid surface, thereby facilitating the dissolution of carbon dioxide.

The method of the present disclosure involving the water storage reactor can treat a large amount of rice hulls for one cycle, and the involved equipment is simple and easy for operation. The method can remove the metal ions and dusts from the rice hulls, so it is particularly suitable for primary tough treatment.

The method of the present disclosure involving the reaction tank has controllable reaction conditions, high carbon dioxide solubility, and high efficiency, which is particularly suitable for secondary fine treatment.

Compared with conventional methods for removal of metal ions using a strong acid, the present disclosure has the following advantages:

1. The carbonic acid has weak acidity, and poses little pollution to environment. Carbon dioxide of the industrial flue gas comprising power plant flue gas or exhaust gas is utilized for the removal of metal ions in the rice hulls, which saves the costs and prevents the environmental pollution. A biomass power plant equipped with 12 MW plant unit produces 678 thousand tons of industrial flue gas annually, based on the carbon dioxide percentage of about at least 10%, the carbon oxide content is about 67.8 thousand tons. Making full use of the carbon dioxide will produce considerable economic value.

2. The acidification of the rice hulls produces a precipitate and a solution comprising soluble substances such as sodium, potassium, nitrogen, phosphorus, sulfur. The solution can be used as a direct nutrient solution for plant cultivation. The precipitate can be used as a construction material or an additive, which poses no pollution. Strong acid used in conventional methods tends to pollute environment, and the recycling cost is pretty high.

3. After being washed twice, squeezed using desalinated water, and dried, the acidified rice hulls can be directly transported to a biomass power plant for combustion or thermal decomposition to yield nano silica. If the rice hulls are treated by strong acid, the high temperature calcination is required, followed by soaking in strong acid and washing by high purity water, and then drying, which is very complex.

Thus, in the present disclosure, the industrial flue gas is introduced to water where carbon dioxide is dissolved in the water to yield carbonic acid. The carbonic acid reacts with the rice hulls soaked in the water whereby removing the metal ions. After being washed and dried, the treated rice hulls can be directly transported to a biomass power plant for combustion or thermal decomposition, no need of high temperature calcination, to yield nano silica. The method reuses the industrial flue gas, reduces the emissions, so it is environmentally friendly, and has low pollution, low energy consumption, high efficiency.

DETAILED DESCRIPTION OF THE EMBODIMENTS

For further illustrating the invention, experiments detailing a method for removal of metal ions from rice hulls by utilizing industrial flue gas are described below. It should be noted that the following examples are intended to describe and not to limit the invention.

Example 1

Figure 1:
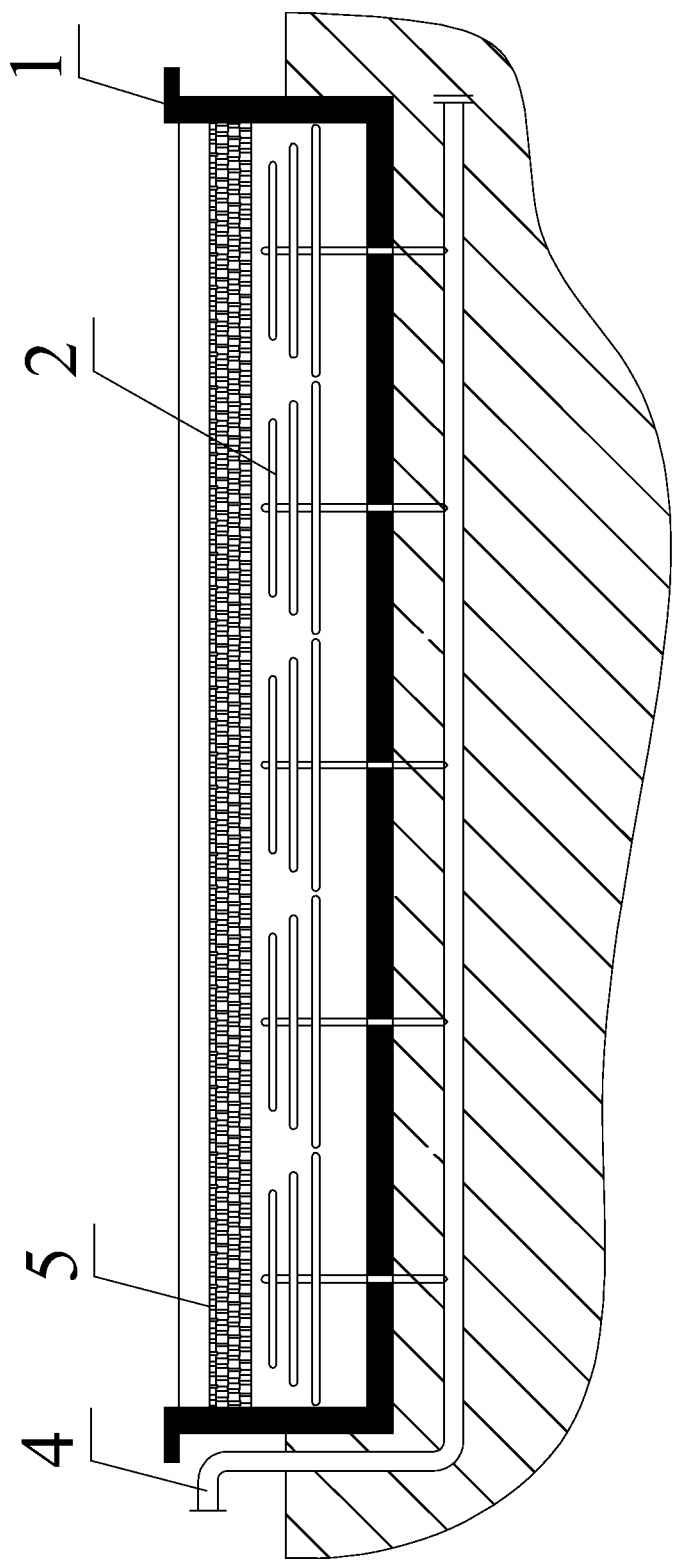
FIG. 1 is a sectional view of a water storage reactor in according to one embodiment of the invention.
Figure 2:
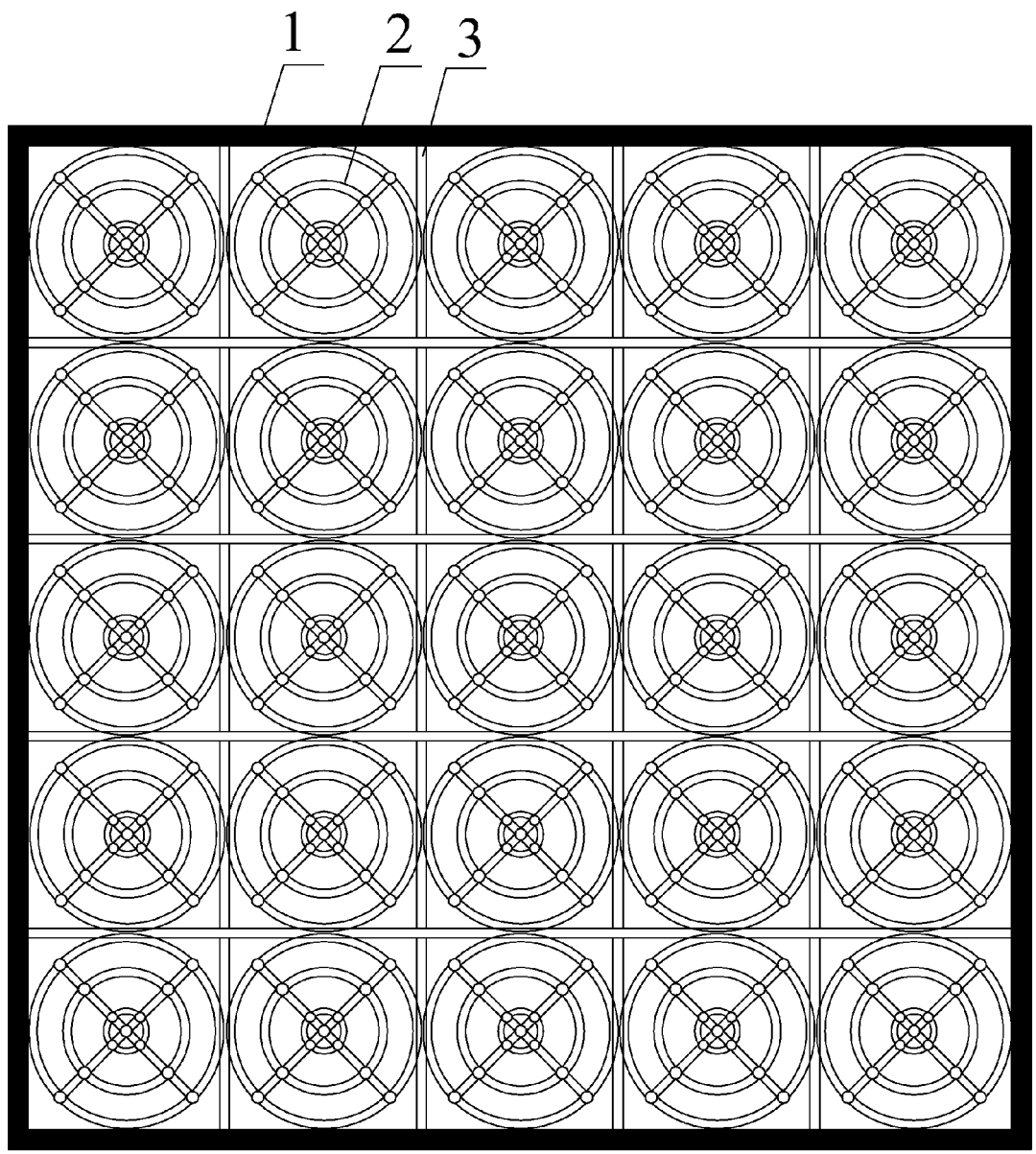
FIG. 2 is a top view of a water storage reactor in FIG. 1.

As shown in FIGS. 1-2, a method for removal of metal ions from rice hulls by utilizing industrial flue gas is described as follows.

1. A water storage reactor 1 having a depth of 7 m and a length and width respectively of 100 m was provided. 25 gas dispersion devices 2 for introducing industrial flue gas were disposed at the bottom of the water storage reactor 1. The gas dispersion devices 2 comprised a gas orifice (not shown in the drawings) configured to horizontally or vertically agitate water to form vortexes. The industrial flue gas was sprayed from the gas orifice. The gas orifice was 1.5 m higher than the bottom of the water storage reactor, and had a pore size of 0.01 mm. The gas dispersion devices 2 further comprised a plurality of microporous aerators, and the industrial flue gas was sprayed from the microporous aerators.

2. The rice hulls 5 was bagged, placed in the water storage reactor 1, and pressed down using press bars to be lower than the water surface of the water storage reactor.

3. The industrial flue gas released from a biomass power plant was filtered by dust collecting equipment, and received by a gas main 4 which was connected to the gas dispersion devices. The industrial flue gas was sprayed into the water with depth of 5.5 m via the gas dispersion devices 2. Under such conditions, the dissolution amount of carbon dioxide in the water was increased by 5 folds compared with that under normal temperature and pressure, that is, 1 g of carbon dioxide was dissolved per 100 g of water. Thus, a carbonic acid solution was obtained, which was adapted to acidify the rice hulls 5. The metal ion of the rice hulls reacted with the carbonic acid solution to yield a precipitate. Thereafter, the rice hulls 5 were washed, and squeezed with desalinated water, whereby removing the metal ion from the rice hulls 5.

Besides the precipitate, the acidification of the rice hulls also produced a solution. The solution was rich in nitrogen, phosphorus, potassium, sodium, and small organic molecules. The precipitate was mainly a carbonate and oxide of a metal such as aluminum, calcium, magnesium, iron, and manganese. The insoluble substances and the dust in the industrial flue gas precipitated in the bottom of the water storage reactor. The treatment period for the rice hulls lasted for 6 days. Then, the rice hulls were washed twice, and then desalinated water added, and squeezed. After such steps, between 60 and 75% of metal ions were removed. For each cycle, the treatment amount of the rice hulls can reach about 2500 tons.

Metal residues in the rice hulls after being treated by method in Example 1, Example 2, and a combination thereof, are listed in Table 1.

TABLE 1

| Sample | Elements | Components (%) | | | | | | | | | | | | Metal content |
| --- | --- | --- | --- | --- | --- | --- | --- | --- | --- | --- | --- | --- | --- | --- |
| | | $SiO_2$ | Al | Fe | Mn | Mg | Ca | Cu | Zn | Ti | K | Na | others | |
| Raw rice hulls | Content | 80.5 | 3.80 | 0.44 | 0.2 | 2.71 | 3.56 | 0.027 | 0.003 | 0.31 | 2.8 | 1.53 | 4.12 | 15.38 |
| Method in Example 1 | (wt. %) | 88.3 | 1.3 | 0.2 | 0.1 | 1.0 | 1.1 | 0.025 | 0.002 | 0.2 | 1.4 | 1 | 2.4 | 6.33 |
| Method in Example 2 | | 94.7 | 0.7 | 0.18 | 0.06 | 0.5 | 0.6 | 0.015 | 0.001 | 0.15 | 0.5 | 0.6 | 2 | 3.30 |
| Combination thereof | | 97.5 | 0.4 | 0.1 | 0.03 | 0.2 | 0.2 | 0.01 | 0 | 0.1 | 0.2 | 0.3 | 1 | 1.54 |

Example 2

Figure 3:
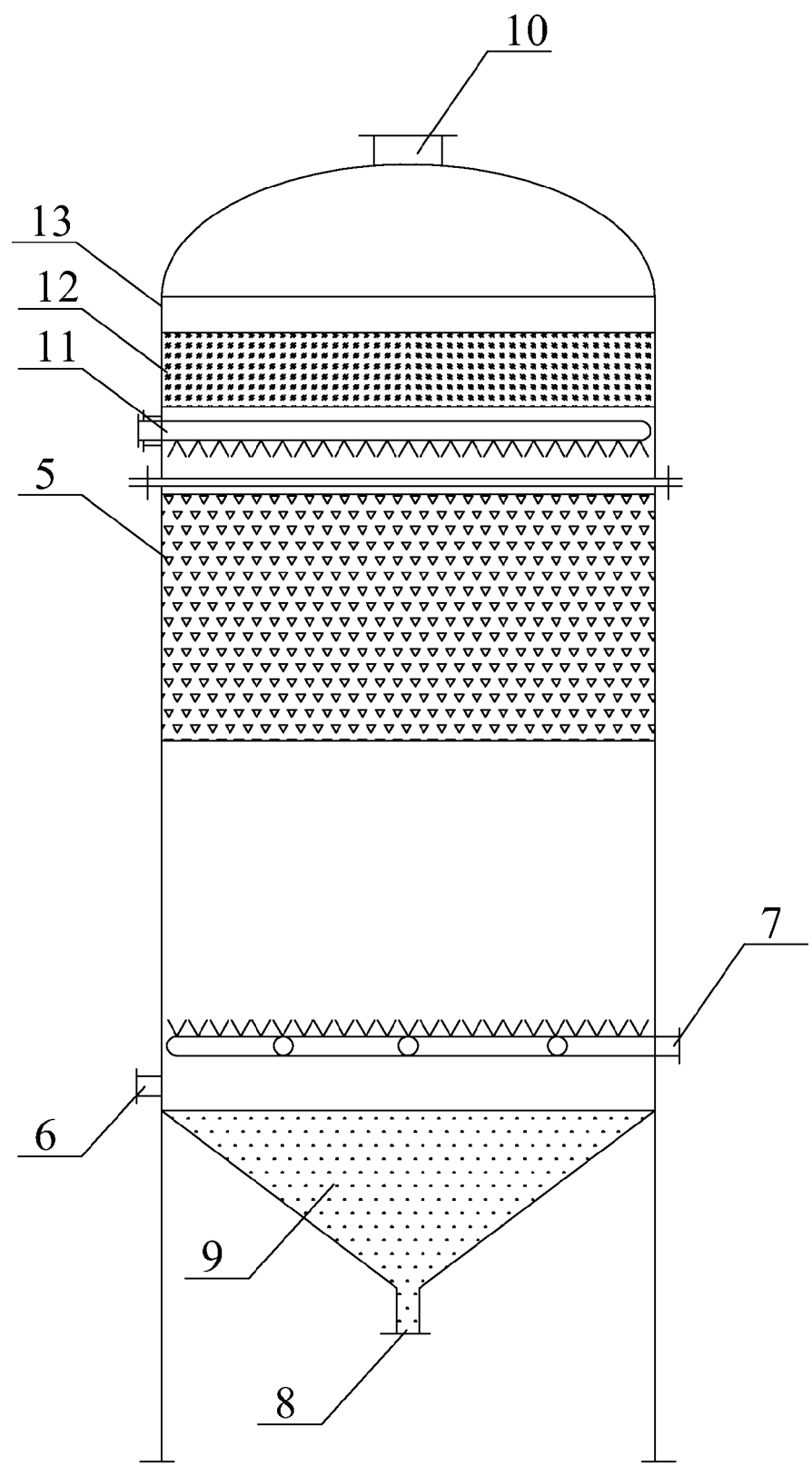
FIG. 3 is a sectional view of a reaction tank in according to one embodiment of the invention.

As shown in FIG. 3, a method for removal of metal ions from rice hulls by utilizing industrial flue gas is described as follows.

A reaction tank 13, having a height of 15 m and an inside capacity of 1000 m³, was provided. A gas distributor 7 comprising microporous aerators was disposed at the lower part of the reaction tank 13. A recycle liquid outlet 6 was disposed on the wall of the reaction tank 13 below the gas distributor 7. A gas outlet 10 was disposed at the top of the reaction tank 13, and a cone was disposed at the bottom of the reaction tank for collecting precipitates. At the bottom of the cone, a precipitate outlet 8 was disposed. A demister 12 and a liquid distributor 11 were disposed at the upper part of the reaction tank 13. The demister 12 was disposed above the liquid distributor 11.

Firstly, the reaction tank 13 was filled with rice hulls and water. The rice hulls were floated on the water surface, and was below the liquid distributor 11. The gas outlet 10 was closed. The industrial flue gas was sprayed from the microporous aerators of the gas distributor 7. Under such conditions, the pressure of the industrial flue gas in the reaction tank 13 increased rapidly. The dissolution amount of carbon dioxide in the water was increased by 20 folds compared with that under normal temperature and pressure, that is, 4 g of carbon dioxide was dissolved per 100 g of water. Thus, a carbonic acid solution was obtained, which was adapted to acidify the rice hulls 5. The carbonic acid solution was sprayed on the rice hulls 5 from the liquid distributor 11, so that the metal ion of the rice hulls reacted with the carbonic acid solution to yield a precipitate. Thereafter, the rice hulls 5 were washed, and squeezed with desalinated water, whereby removing the metal ion from the rice hulls 5.

After such steps, 80% of metal ions were removed. For each cycle, the treatment amount of the rice hulls can reach about 100 tons.

If the water storage reactor 1 in Example 1 and the reaction tank in Example 2 were combined for use, that is, the water storage reactor 1 is used for primary treatment, and the reaction tank 13 is used for secondary treatment, and the resulting rice hulls are washed and squeezed using desalinated water thrice, then 90% of metal ions are removed.

As shown in the above table, the method of the invention exhibits the same removal effect of metal ions from rice hulls by utilizing industrial flue gas as by utilizing strong acid, and the resulting rice hulls can absolutely meet the requirement for preparation of silica for a biomass power plant.

Unless otherwise indicated, the numerical ranges involved in the invention include the end values.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for removal of metal ions from rice hulls, the method comprising:
    1) providing a water storage reactor, disposing a gas dispersion device at the bottom of the water storage reactor, and filling the water storage reactor with water;
    2) placing the rice hulls in a bag and placing the bag in the water storage reactor, and submerging the bag in the water;
    3) bubbling industrial flue gas into the water via the gas dispersion device; controlling the amount of the industrial flue gas such that about 1 g of carbon dioxide is dissolved per 100 g of water, thus generating a carbonic acid solution;
    4) reacting the carbonic acid solution with metal ions in the rice hulls to yield acidified rice hulls and a precipitate; and
    5) washing the acidified rice hulls to remove the precipitate and to yield washed rice hulls, and then squeezing the washed rice hulls to remove the metal ions from the washed rice hulls.

2. The method of claim 1, wherein the water storage reactor has a depth of between 6 and 10 m.

3. The method of claim 2, wherein the gas dispersion device comprises a gas orifice configured to horizontally or vertically agitate water to form vortexes, and the industrial flue gas is sprayed from the gas orifice.

4. The method of claim 3, wherein the gas orifice is at least 1.5 m higher than the bottom of the water storage reactor.

5. The method of claim 4, wherein the gas orifice has a pore size of between 0.005 and 0.012 mm.

6. The method of claim 3, wherein the gas dispersion device further comprises a plurality of microporous aerators, and the industrial flue gas is sprayed from the microporous aerators.

7. The method of claim 5, wherein the gas dispersion device further comprises a plurality of microporous aerators, and the industrial flue gas is sprayed from the microporous aerators.

8. A method for removal of metal ions from rice hulls, the method comprising:
   1) providing a reaction tank, the reaction tank comprising a gas distributor disposed at a lower part thereof and a liquid distributor disposed at an upper part thereof, wherein the gas distributor comprises microporous aerators, a recycle liquid outlet is disposed on a wall of the reaction tank below the gas distributor, a gas outlet is disposed at the top of the reaction tank, and a precipitate outlet is disposed at the bottom of the reaction tank;
   2) filling the reaction tank with the rice hulls and water, closing the gas outlet, and spraying industrial flue gas from the microporous aerators of the gas distributor;
   3) dissolving carbon dioxide in the industrial flue gas into the water at 4 g of carbon dioxide per 100 g of water, to yield a carbonic acid solution;
   4) reacting the carbon acid solution with metal ions of the rice hulls to yield acidified rice hulls and a precipitate; and
   5) washing the acidified rice hulls to yield first washed rice hulls, washing the first washed rice hulls with desalinated water to yield second washed rice hulls, and then squeezing the second washed rice hulls to remove the metal ions from the second washed rice hulls.

* * * * *